(12) United States Patent
Kok

(10) Patent No.: US 7,602,429 B2
(45) Date of Patent: Oct. 13, 2009

(54) PAIRED DIFFERENTIAL ACTIVE PIXEL SENSOR

(76) Inventor: Chi Wah Kok, RM C, 7/F, Block 4, Uptown Plaza, Tai Po, N.T., Hong Kong (CN)

( * ) Notice: Subject to any disclaimer, the term of this patent is extended or adjusted under 35 U.S.C. 154(b) by 563 days.

(21) Appl. No.: 11/346,494

(22) Filed: Feb. 1, 2006

(65) Prior Publication Data

US 2007/0177043 A1   Aug. 2, 2007

(51) Int. Cl.
*H04N 3/14* (2006.01)
(52) U.S. Cl. ................. 348/300; 348/301; 348/294; 348/230.1
(58) Field of Classification Search ............... 348/308, 348/300, 301; 330/252
See application file for complete search history.

(56) References Cited

U.S. PATENT DOCUMENTS

| | | | |
|---|---|---|---|
| 6,084,229 A | 7/2000 | Pace et al. | |
| 6,160,281 A * | 12/2000 | Guidash | 257/292 |
| 6,580,063 B1 * | 6/2003 | Okamoto | 250/208.1 |
| 6,657,665 B1 * | 12/2003 | Guidash | 348/308 |
| RE38,499 E * | 4/2004 | Merrill et al. | 348/301 |
| 6,717,616 B1 * | 4/2004 | Afghahi et al. | 348/300 |
| 6,974,944 B2 * | 12/2005 | Funakoshi et al. | 250/214 A |
| 7,081,608 B2 * | 7/2006 | Bock | 250/214 R |
| 7,157,682 B2 * | 1/2007 | Brehmer et al. | 250/208.1 |
| 2001/0030702 A1 * | 10/2001 | Zarnowski et al. | 348/308 |

* cited by examiner

*Primary Examiner*—David L Ometz
*Assistant Examiner*—Angel L Garces-Rivera
(74) *Attorney, Agent, or Firm*—Schwabe Williamson & Wyatt P.C.

(57) ABSTRACT

Imaging devices—as well as methods for operating such devices—that include active pixel sensors and a transistor that, when paired with the transistor in an adjacent pixel, will form a differential input pair of an operational amplifier. At least some portion of the operational amplifier circuit is located off the active pixel sensor, and shared by the rows or columns of the active pixel sensor array.

23 Claims, 14 Drawing Sheets

FIG.1 *(PRIOR ART)*

PAIRED DIFFERENTIAL ACTIVE PIXEL SENSOR

BACKGROUND OF THE INVENTION

The present invention relates to an image sensor, and more particularly to a CMOS active pixel sensor that is configured with a distributed operational amplifier architecture with only the differential input transistors placed inside the pixels, where the rest of the operational amplifier circuit is placed outside the pixel array, and the operational amplifier can be configured for unit gain to achieve high performance pixel readout with reduced transistor mismatch problem.

CMOS active pixel sensors (APS) are used in a wide range of imaging applications. A conventional CMOS APS is illustrated in the circuit diagram in FIG. 1. The APS includes a photodiode D1 (or other photo sensing elements) acting as light sensing means, which is coupled to the gate of a N-channel transistor M1. The transistor M1 is configured as a source follower amplifier which in turn drives the external circuit through a row select transistor M2, which connects M1 to the bit line, which in turn is connected to the external circuit. The photodiode D1 is also connected to a reset transistor M3, which resets the photodiode to an initial integration voltage of $(V_R-V_T)$, wherein the $V_R$ is the reset voltage and the voltage $V_T$ is a threshold voltage of the reset transistor M3.

With reference to FIG. 2, operations of the APS are typically performed in cycles (or frame intervals) of three steps: (1) reset: the photodiode D1 in the APS is reset to the initial integration voltage; (2) image integration: the light energy is collected and converted into an electrical signal through the photodiode D1; (3) read out: at the end of the image integration period, the voltage $V_d$ across the photodiode D1 is equal to $(V_R-V_T-V_s)$, wherein the voltage $V_s$ is a voltage change due the photons absorbed in the photodiode D1.

Thus, voltage $V_s$ corresponds to the absorbed photons and can be determined by subtracting the voltage at the end of the image integration period from the voltage at the beginning of the image integration period. That is, the voltage $V_s$ is $(V_R-V_T)-(V_R-V_T-V_S)$. Following the image integration period, the APS is read out by turning on the row select transistor M2 (which has been kept off until this point in the cycle). When the voltage across the photodiode D1 decreases, the gate voltage of the source follower transistor M1 is reduced, causing a reduction in the amount of current flowing to the bit line through the row select transistor M3. Therefore, a voltage $V_P$ (referred as "pixel voltage") on the bit line can be measured by a conventional current detector. A graphical illustration of the pixel voltage of the active pixel sensor is shown in FIG. 2.

One problem of the above described CMOS APS is the source follower gain variation of M1 from one APS to another due to variations of MOSFET thresholds. The source follower gain variation results in a pixel to pixel gain mismatch.

Another problem of the read out circuitry of the APS in FIG. 1 is associated with large format image sensors, where the APS are arranged to form a large array or matrix. FIG. 3 is a schematic diagram of an APS imaging system. The APS imaging system 300 has a row decoder 310, a plurality of APS output circuits 320 (such as correlative double sampling circuits), a timing controller 330, and an array of APS 340. Each APS 340 is capable of converting a detected quantity of light to corresponding electrical signal at the output circuits 320. A plurality of control lines 350 extend along corresponding sensor rows from the row decoder 310 and are connected to corresponding pixel sensors 340 in the respective sensor row. Each of the control lines 350 includes a select line 352 and a reset line 354. Each APS output in the corresponding sensor column is coupled by a column output line 360 such as a bit line. In operation, the timing controller 330 provides timing signals to the row decoder 310, which sequentially activates each row of active pixel sensors 340 via the control lines 350 to detect the light intensity and to generate the corresponding output voltage signals during each frame interval.

Each column may have a large number of sensors 340. The source follower M1 drives the entire column during read out and hence drives the entire bit line capacitance. The large driving load requires a more powerful source follower M1 and row select transistor M2. The more powerful M1 and M2, the larger the transistor size, and thus the higher total bus (bit line) capacitance. The higher bus capacitance makes the bus even harder to drive. Therefore, the evolution of the system eventually reaches a point of diminishing return.

To improve the performance of the APS and to allow the construction of large APS array for high resolution APS imaging system, an improved read out circuits is required. The main requirement for an improved read out circuit is gain accuracy. As widely known, the best approach for this is to use a high gain amplifier combined with an accurate feedback network. FIG. 4 is a schematic diagram of an APS connected to a high gain operational amplifier A1 configured to have unit gain through negative feedback. The output of the operational amplifier A1 is connected to the bit line through a switch S1, which can be constructed by NMOS transistor. Since operational amplifier in negative feedback form is robust to process variation, therefore, the constructed APS imaging system will not suffer from pixel to pixel gain mismatch problem.

However, the limited amount of chip area is the prime constraint in implementing the APS imaging system. High density, mega pixel imaging systems require compact image sensing elements and thus leave very little room for circuitry. Therefore, it is undesirable to put the complete operational amplifier structure within the pixel, as the resulting increase in sensor area would make the sensor too expensive.

Distributed amplifiers have been used to address the aforementioned problem. A certain part of the operational amplifier circuit is implemented inside the pixel, while the rest is in the column circuitry, and is shared by all the pixels of a column. On way to include the operational amplifier within the pixel in a distributive way has been described in the U.S. Pat. No. 6,084,229, which is incorporated herein by reference. According to the disclosure of the patent (see FIG. 5), the APS 500 includes one of the differential input transistors M4 of the operational amplifier A2 is on-pixel and connected to the +bit line 510 and −bit line 520 through the row select transistor M6. In contrast, the other differential input transistor M5 and the associated circuitry of the operational amplifier are off pixel. There can be a plurality of input transistors M4, each at a respective pixel, all connected to the same operational amplifier A2.

However, there are a number of parasitic effects with such partitioning of the operational amplifier circuit between column and pixel. When the differential pair (M4 and M5) of the amplifier is divided between pixel and column, the mismatch between M4 and M5 will result in high output offset, low common mode rejection ratio, and low power supply rejection ratio. Furthermore, since the column lines will be long, there will be a lot of parasitic capacitance to be added to M4 and will thus further enhance the mismatch between the differential pair and further reduce the performance of the constructed operational amplifier A2, and hence the read out circuitry of the APS.

There is thus a need for improved distributed amplifiers for APS.

SUMMARY OF THE INVENTION

The invention is aimed at providing an improved amplifier and method for APS. The partitioning of the operational amplifier circuit according to one aspect of the invention results in matched transistors in the differential input pair of the operational amplifier and is robust to capacitive load. At the same time, the invention does not result in tremendously increased silicon area required by each APS.

In one embodiment of the invention, an imaging device comprises a plurality of radiation sensor elements, such as photo diodes, each configured to receive a dosage of radiation and in response produce a signal indicative of the dosage. The device further comprise a differential input amplifier comprising a plurality of input circuitries, such as transistors. Each of the input circuitries has an input terminal at least intermittently operatively connected to a respective one of the plurality of radiation sensor elements to receive the signal from the radiation sensor element. The amplifier also comprises an output terminal.

In another embodiment of the invention, a method for detecting an image comprises arranging a plurality of radiation sensor elements in to at least one array of pairs of sensor elements; at least intermittently operatively connecting a plurality of pairs of matched pairs of input transistors of a differential input amplifier respectively to the pairs of sensor elements; and positioning each of the input transistors adjacent a respective sensor.

BRIEF DESCRIPTION OF THE DRAWINGS

An embodiment of the invention will be described by way of example and with reference to the accompanying drawing, in which.

DETAILED DESCRIPTION OF ILLUSTRATIVE EMBODIMENTS

Figure 1:
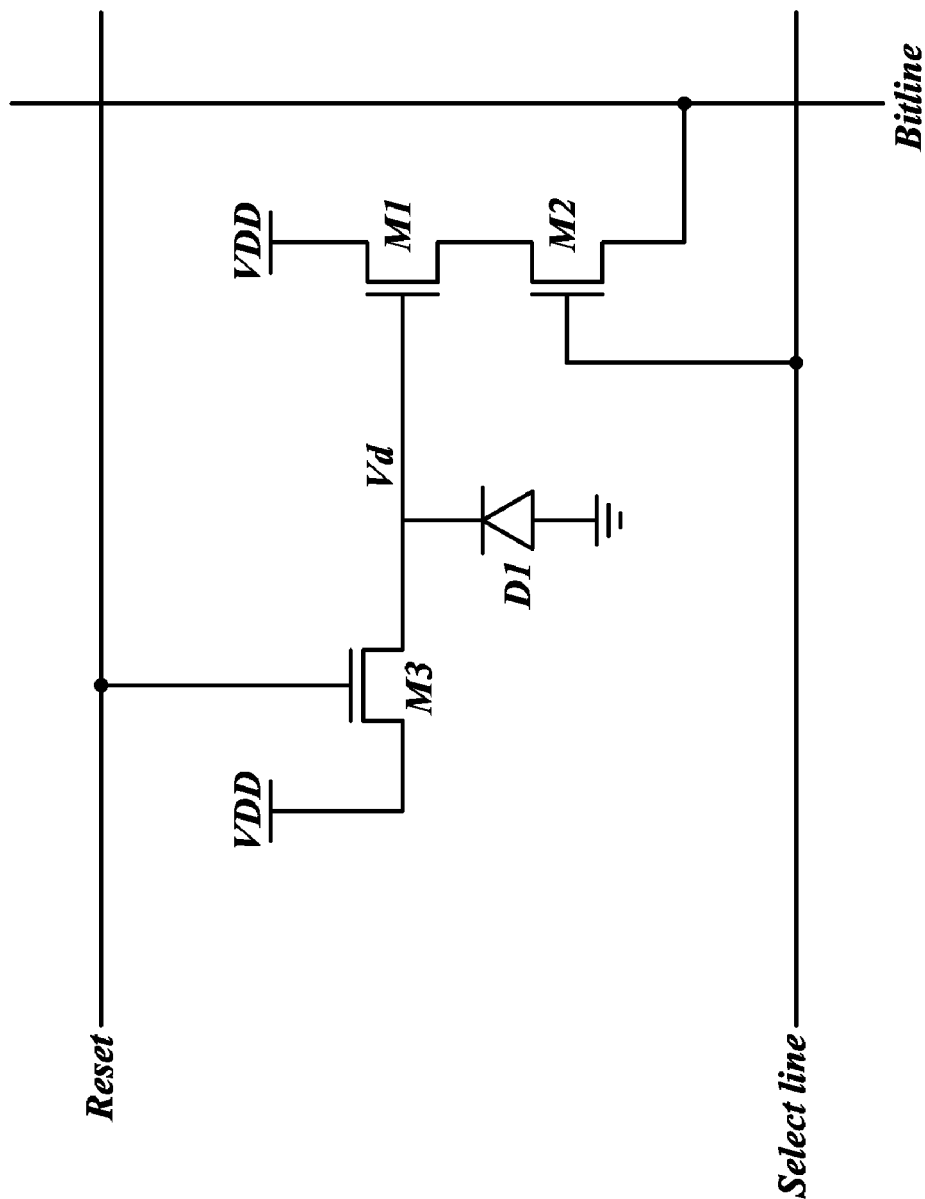
FIG. 1 is a circuit diagram illustrating a prior art CMOS active pixel sensor.
Figure 2:
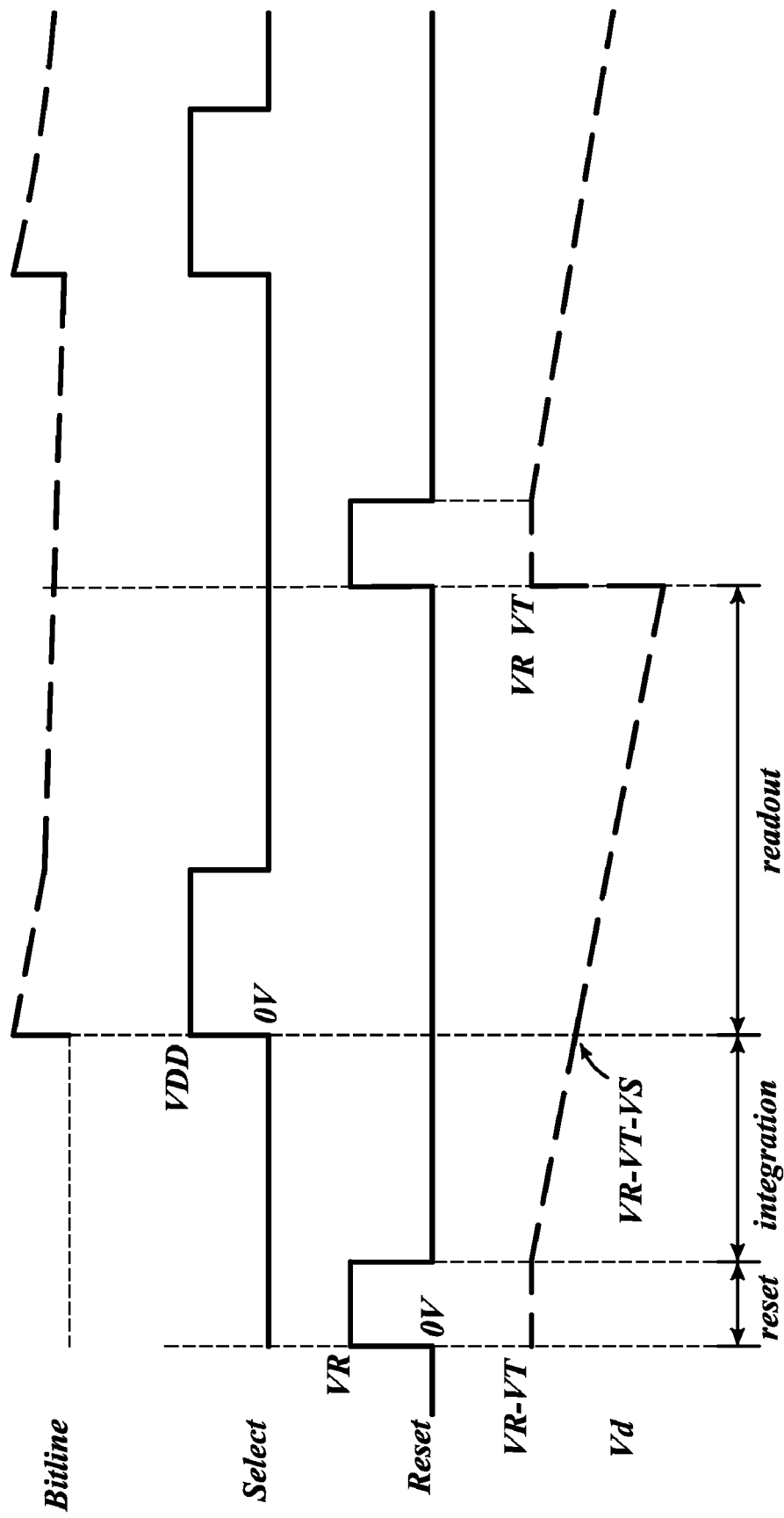
FIG. 2 is a graph showing the operating voltage of the CMOS active pixel sensor shown FIG. 1.
Figure 3:
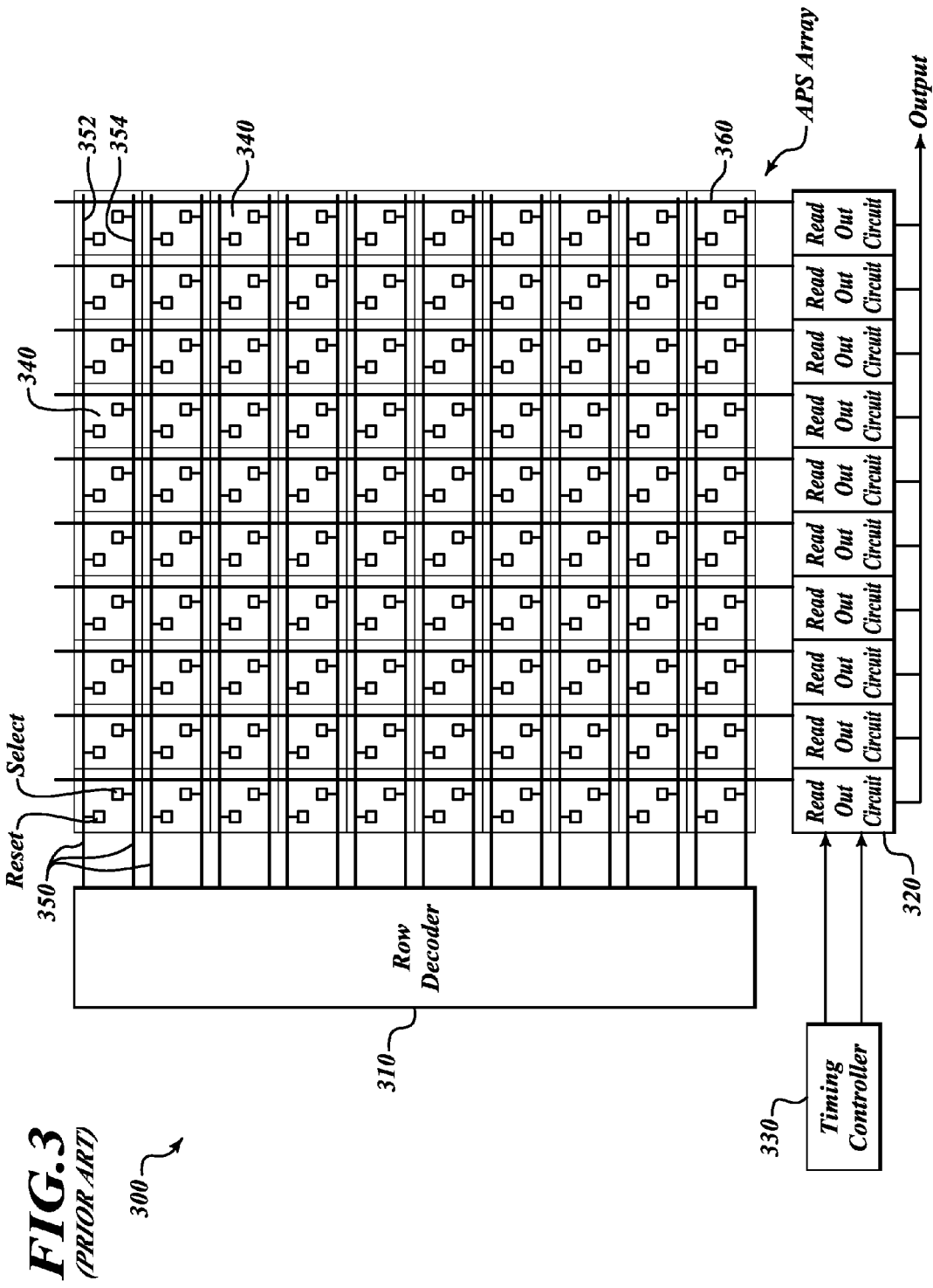
FIG. 3 is a circuit diagram of an imaging system constructed by active pixel sensor array.
Figure 4:
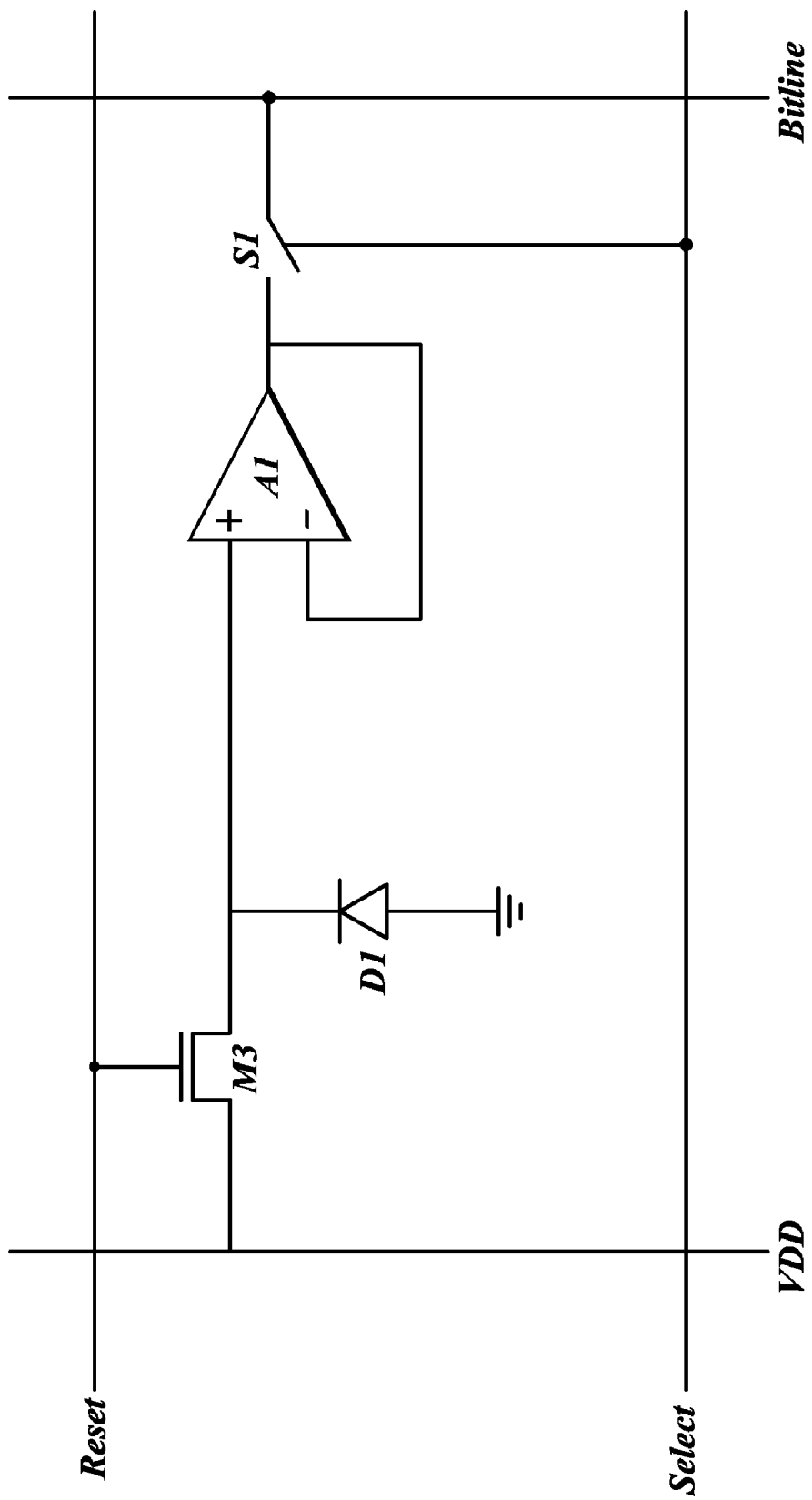
FIG. 4 is a circuit diagram of a CMOS active pixel sensor with an operational amplifier configured with negative feedback to form a unit gain amplifier as the read out circuit.
Figure 5:
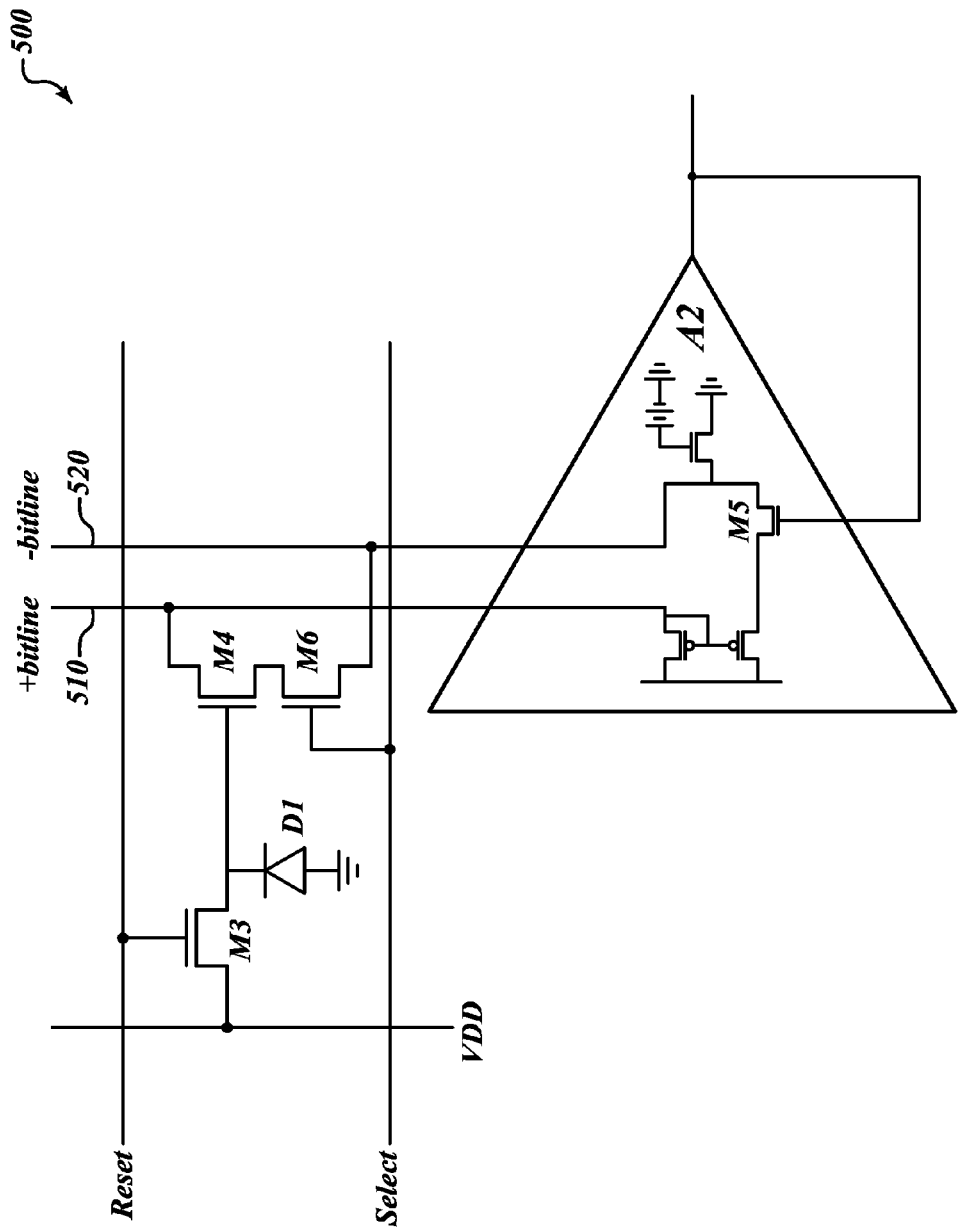
FIG. 5 is a circuit diagram of a prior art CMOS active pixel sensor with distributed operational amplifier.
Figure 6:
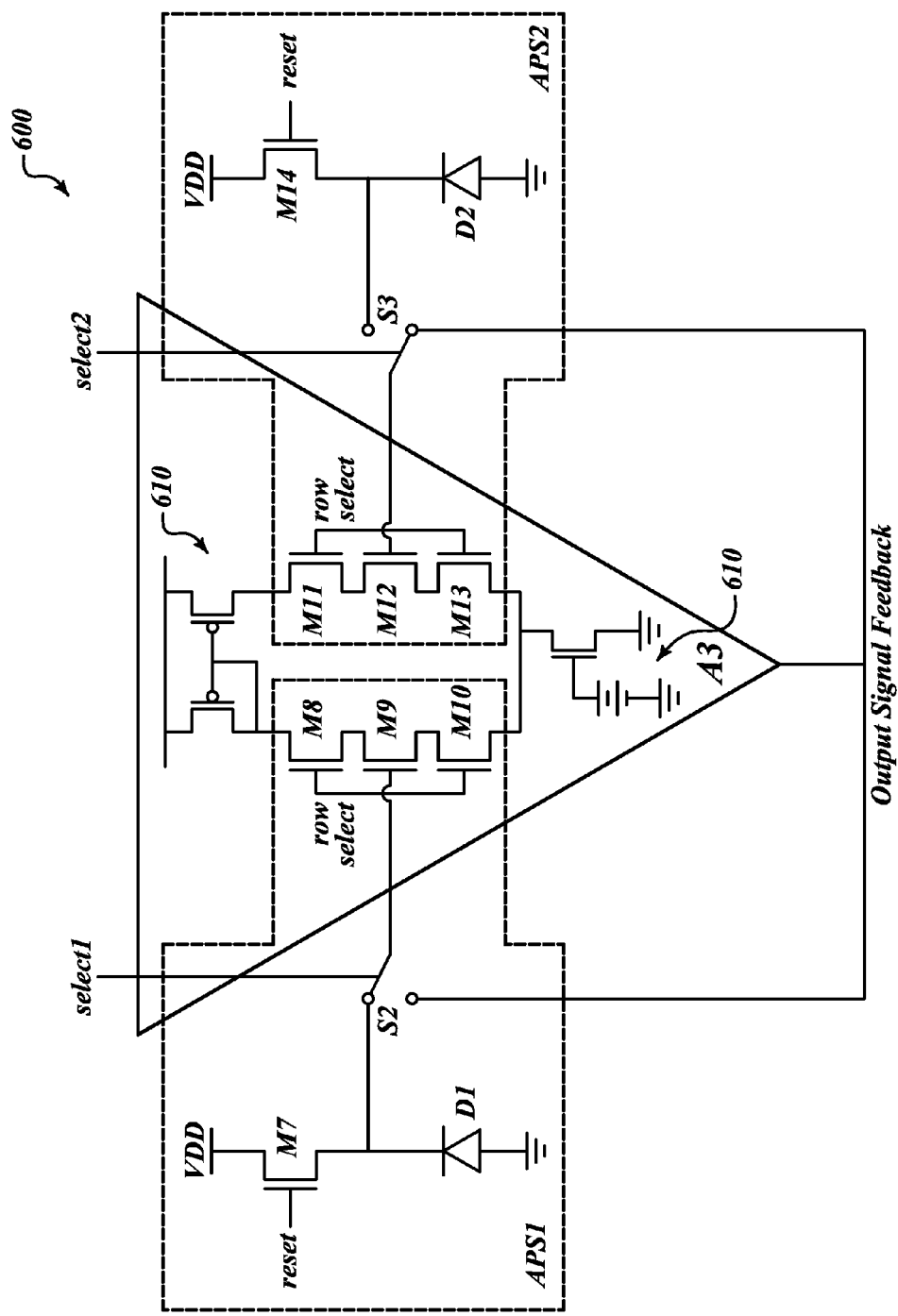
FIG. 6 is a circuit diagram of a CMOS active pixel sensor with distributed operational amplifier in an embodiment of the invention.
Figure 9:
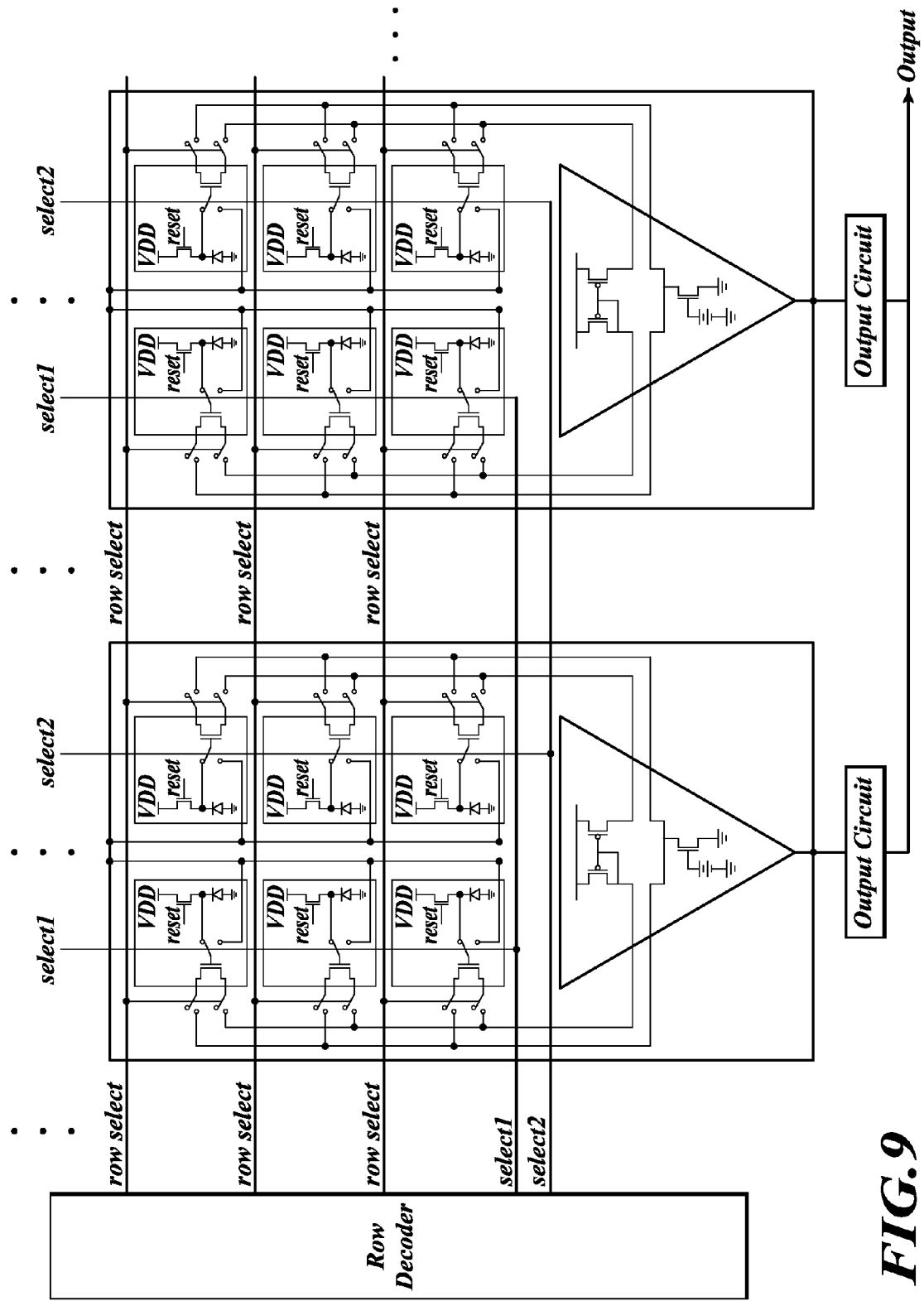
FIG. 9 is a circuit diagram of an imaging system constructed by the CMOS active pixel or in an alternative embodiment of the invention.

In a first embodiment of the invention, as schematically shown in FIG. 6, a CMOS APS system 600 includes two active pixel sensors APS1 and APS2 sharing an operational amplifier A3, which can be configured as unit gain amplifier to read out the voltage on the photodiodes D1 and D2, each at a pixel. At a given moment, the switches S2 and S3 select one of the pixels (in this case D1) to be the input of the amplifier, while disconnecting the other (in this case D2) from the amplifier A3. Instead, the input transistor (in this case M12) will be connected to the output of the operational amplifier A3 to form a feedback loop. Each of the two active pixel sensors in this illustrative embodiment includes one MOSFET (M9 and M12), which forms a half of the differential input pair of the operational amplifier A3. The rest of the operational amplifier A3, including a current mirror 610 and current source 620, is located away from the pixels in a column of pairs of sensor elements as shown in FIG. 9. Several switches are used to connect and isolate the APS from the bit line that connect to the rest of the operational amplifier circuit. Those switches can be constructed by transistors M8, M10, M11 and M13, as shown in FIG. 6.

Figure 7:
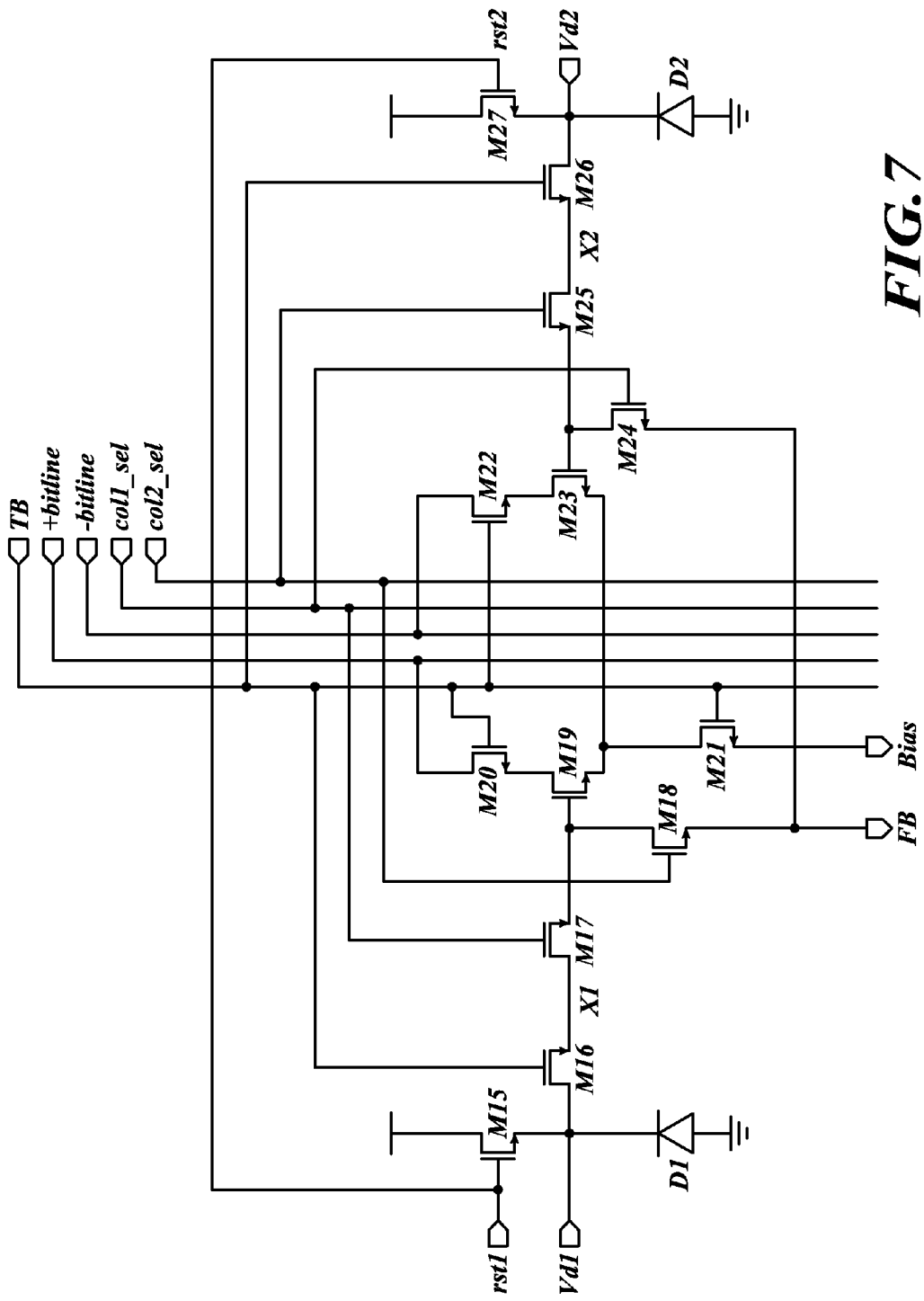
FIG. 7 is a circuit diagram showing the detailed implementation of a CMOS active pixel sensor in another embodiment of the invention.

Other configurations are also possible and will be implemented according to the principles of the invention. An example of a construction of the CMOS active sensor in FIG. 6 is shown in FIG. 7, where the two APS's (APS1 and APS2) are adjacent in column. In a similar fashion, the same idea can be applied to distribute the differential input transistor with APS's being adjacent in row. An example of distributing the differential transistor pairs in APS of different rows in another embodiment of the invention is shown in FIG. 10.

The operation of the CMOS active pixel sensor depicted in FIG. 7 can be described with reference to FIG. 8, which details the operating voltages of various nodes in the circuit diagram of FIG. 7. The photodiode D1 and D2 are reset to initial voltage using reset transistor M15 and M27, as in conventional APS. When the rs signal is asserted, M16 and M26 are turned on, and the charges stored in D1 and D2 will be transferred to node x1 and x2, respectively. To read out the voltage of D1 via x1, the col1_sel signal is asserted, such that the node x1 is connected to the gate of the M19, which forms one of the differential input transistors of the operational amplifier A3. Meanwhile, the gate of the other differential input transistor M23 of the operational amplifier is connected to the amplifier output feedback signal FB via M24, which is also turned on when col1_sel is asserted. Thus, the differential amplifier is configured to form a negative feedback amplifier with unit gain. As rs signal is asserted, the two differential input transistors M19 and M23 are connected to the +bit_line and –bit_line, respectively, via M20 and M22, respectively. The rs signal also turns on M21, which connects the two differential input transistors M19 and M23 to the biasing current source, which is located off pixel. Similarly, the col2_sel assertion is used to read out the charges stored in D2.

Figure 8:
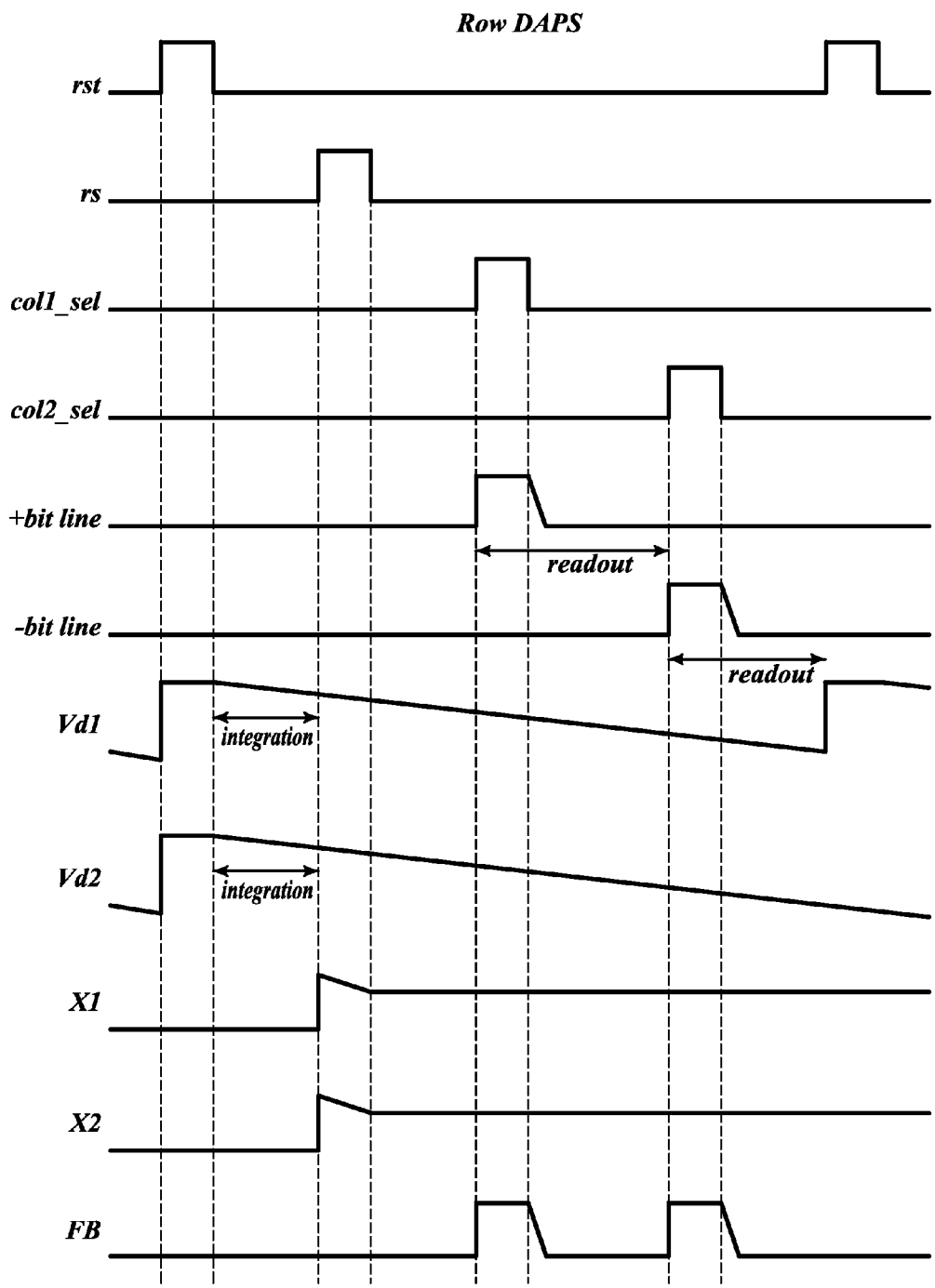
FIG. 8 is a graph illustrating the operating voltage of the CMOS active pixel sensor shown in FIG. 7.

When the CMOS active pixel sensor in accordance with the invention is connected to form an imaging system with an array of AP, as shown in FIG. 9, the CMOS APS can be read out row by row, and in each row, the pixels in even and odd columns are read out in time shared manner, in similar fashion as that shown in FIG. 8 for the CMOS APS in FIG. 7.

Figure 10:
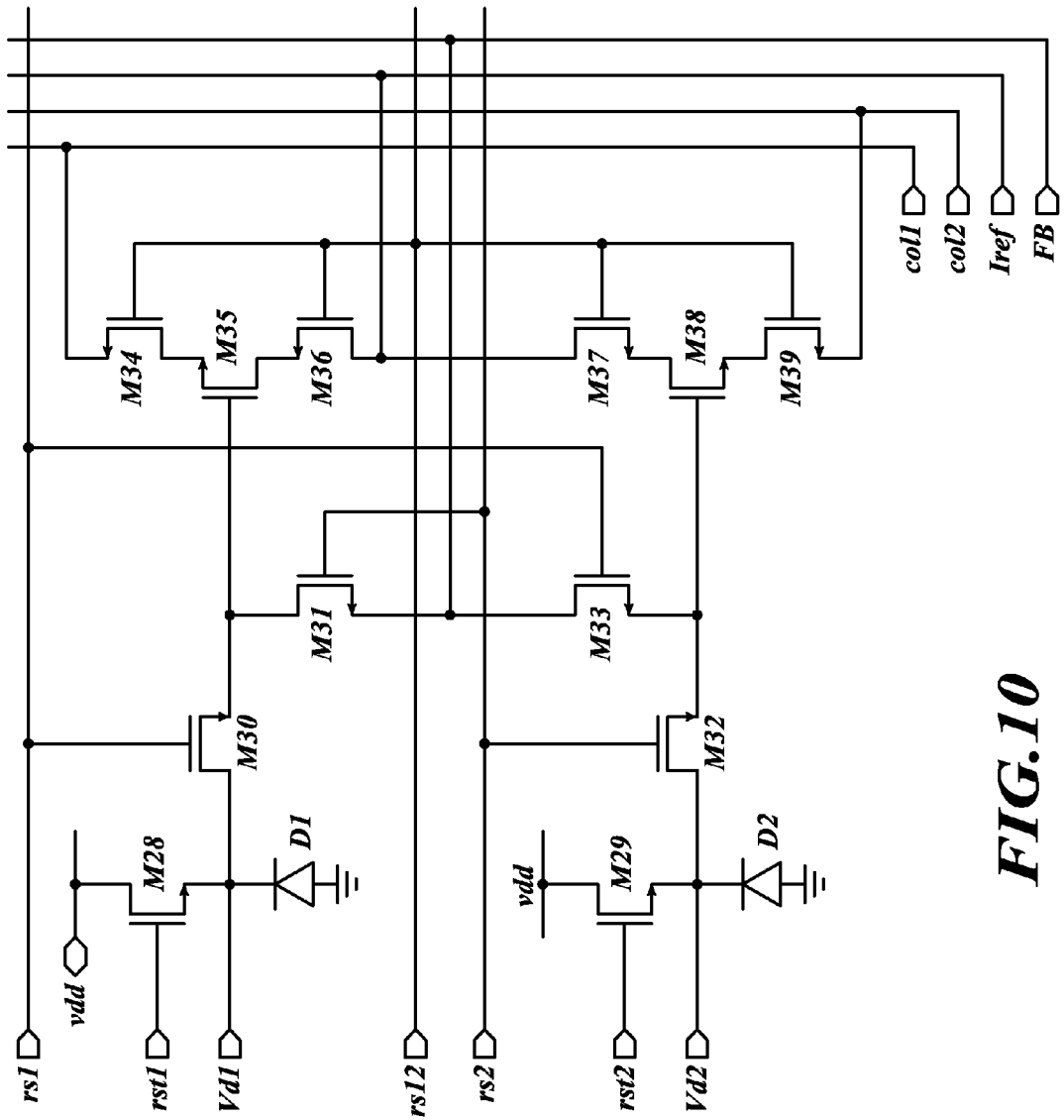
FIG. 10 is a circuit diagram showing the detail implementation of a CMOS active pixel sensor accordance with the present invention where the read out transistors of the CMOS active pixel sensors in different rows are used to form the differential input pair of the operational amplifier.
Figure 11:
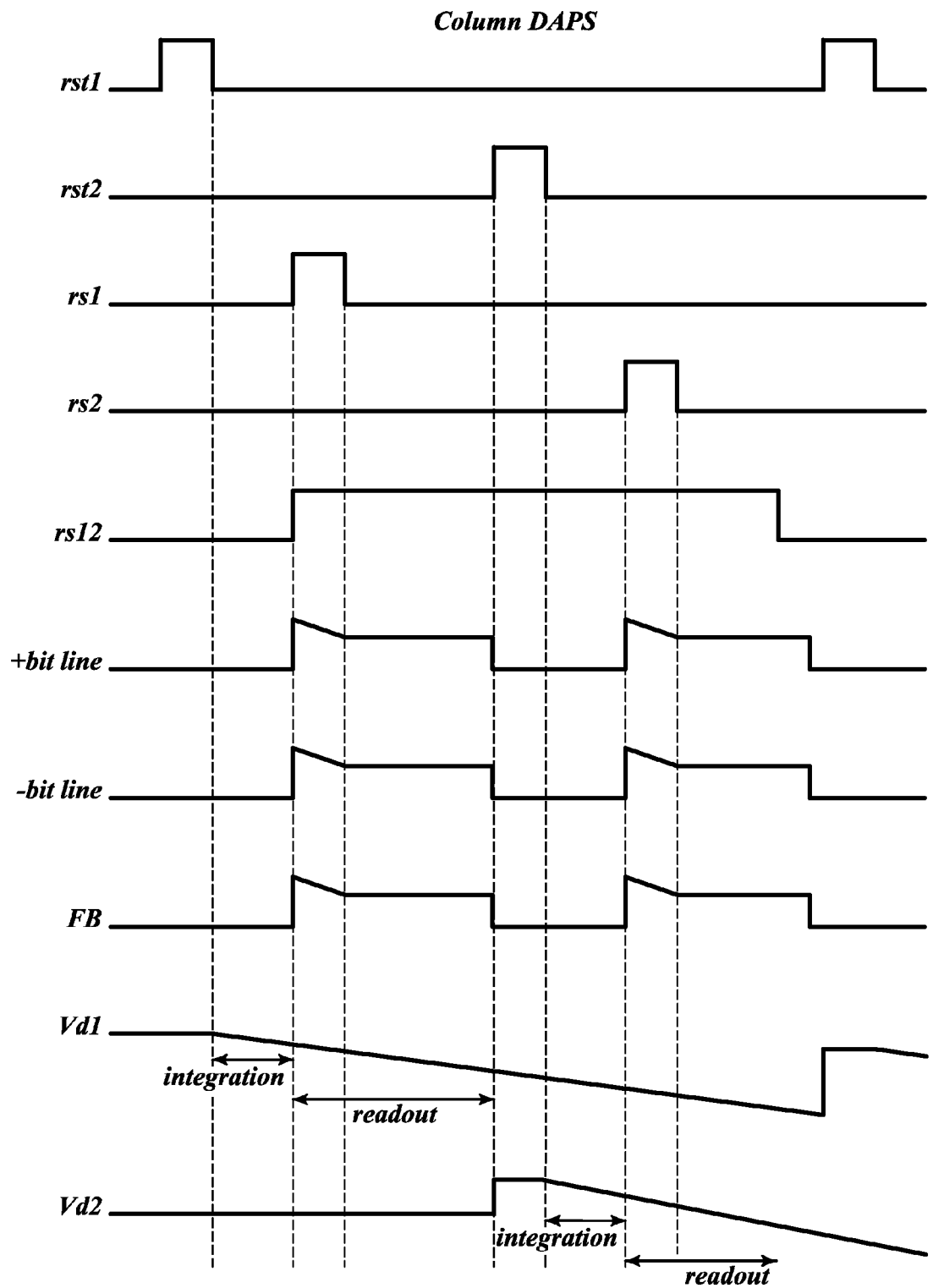
FIG. 11 is a graph showing the operating voltage of an imaging system using CMOS active pixel sensors in FIG. 10.
Figure 12:
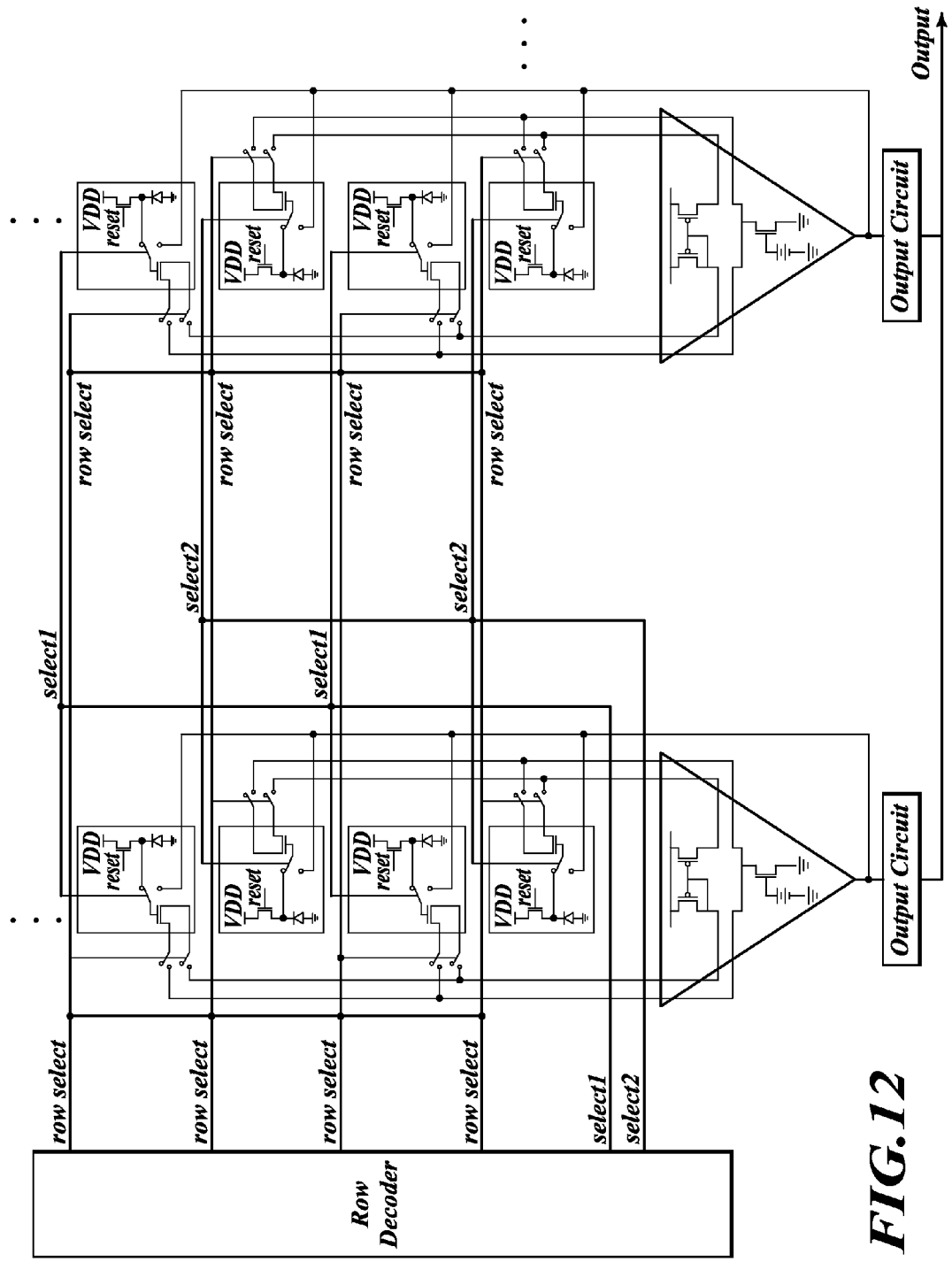
FIG. 12 is a circuit diagram of imaging system constructed by the CMOS active pixel sensor in accordance with the present invention where the read out transistors of the CMOS active pixel sensors in different rows are used to form the differential input pair of the operational amplifier.

The CMOS APS depicted in FIG. 10 operates in a similar fashion as described above, with the roles of row-select (rs) and column-select (col) reversed because the sensor elements are now paired across rows instead of columns. FIG. 11 is a graphical illustration of the operating voltages of the CMOS APS illustrated in FIG. 10. A more extensive sensor matrix in which the inputs to the operational amplifiers are paired across the rows is schematically shown in FIG. 12. Transistors M28-M39 in FIG. 10 may be similar in structure and-/or perform same or similar functions to similar transistors in other embodiments, such as, for example, the transistors shown in FIG. 7. In embodiments, such transistor elements may be arranged to form an operational amplifier across rows rather than columns as described above in regards, for example, to FIG. 7. Photodiodes D1 and D2 may have structure and/or perform functions as is described elsewhere in this paper and will therefore not be described further. The timing diagram of FIG. 11 illustrates the operating voltages rst1 (reset 1), rst2 (reset 2), rs1 (row select 1), rs2 (row select 2), rs12 (row select 1/2), +bit line (corresponding to col1 in FIG. 10), −bit line (corresponding to co12 in FIG. 10), FB (feedback line), Vd1 (voltage of photodiode D1) and Vd2 (voltage of photodiode D2) during an exemplary operation of a row-diode pair as depicted in FIG. 10 according to embodiments.

The CMOS APS imaging system with an array of APS as shown in FIG. 12 can be read out row-by-row. While reading each row, all the APS can be read out simultaneously, unlike the row format counter-partner in FIG. 9. In FIG. 12, the row decoder, select lines, and output circuits may be the same or similar to similar elements depicted in FIG. 9, except that they may be, in embodiments, configured to select and/or read out the APS on a row-by-row basis.

The illustrative embodiments of the invention have the advantage that the differential input transistors of the operational amplifier can be placed in close proximity, thus reducing the mismatch between the differential input transistor pair. Those skilled in the art can design the physical layout of the differential input transistor pairs with a wide variety of layout matching schemes that are consistent with the principles of the invention. Furthermore, the differential input transistor pair is operated and read out in current mode in the illustrative embodiments. The system is therefore robust for capacitive load. As a result, it is very suitable to be used in driving long bit line as in the case of mega pixel imaging systems.

Figure 13:
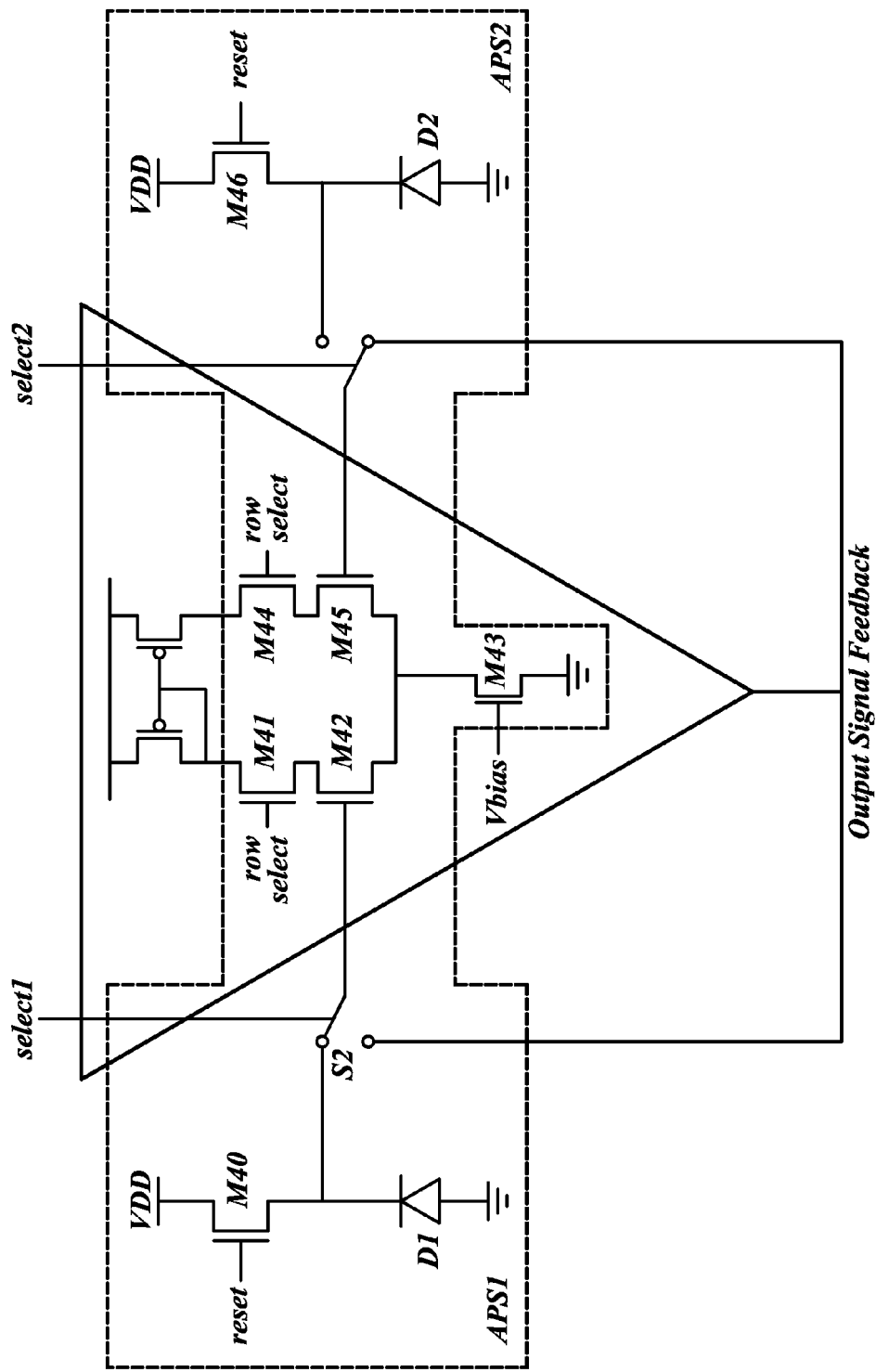
FIG. 13 is a circuit diagram of CMOS active pixel sensor in FIG. 6 that includes the biasing transistor inside the pixel.

To further improve the robustness of the present invention for capacitive load, a biasing transistor M43 can be placed with each differential transistor pair of the operational amplifier as illustrated in FIG. 13, instead of having a single biasing transistor serving the entire column or row as in alternate embodiments. By switching on and off the biasing voltage to the gate of the biasing transistor M43, the biasing transistor will function as a switch to connect the differential input transistor to the bit line and also provide the biasing current to the differential input transistor. Because the biasing voltage is generated off of the sensor array, a high power driver can be used for the biasing voltage to drive the bit line, and is thus robust for capacitive load. Photodiodes D1 and D2, active pixel sensors APS1 and APS2, and transistors M40-M42 and M44-M46 may be configured the same or similar as in previously-described embodiments and will therefore not be further described.

Referring again to FIG. 12, it shows the circuit diagram of a CMOS imaging system formed by CMOS active image sensor array constructed by the CMOS active pixel sensor in accordance with another aspect of the invention. When two CMOS APS in accordance with the invention are paired in the same column but adjacent rows and connected to the bit line at the same time, the output of the operational amplifier will be the sum of the voltage stored in the photodiodes of the two CMOS APS. As a result, the sensitivity of CMOS APS when operating at the same time will be doubled by trading off the resolution of the imaging system. It is to be understood that the number of CMOS APS on the same column and can be connected together at each time is limited only by the total number of rows of the sensor elements. Thus, in another embodiment of the invention, system can be configured to form CMOS APS with different sensitivity and resolution through appropriately connecting a desired number of CMOS APS to the bit line.

The fixed gain of amplifier eliminates the gain variability of the prior art. At each column, correlated double sapling (CDS) can be implemented to eliminate the reset voltage offset across columns as shown in FIG. 9.

Figure 14:
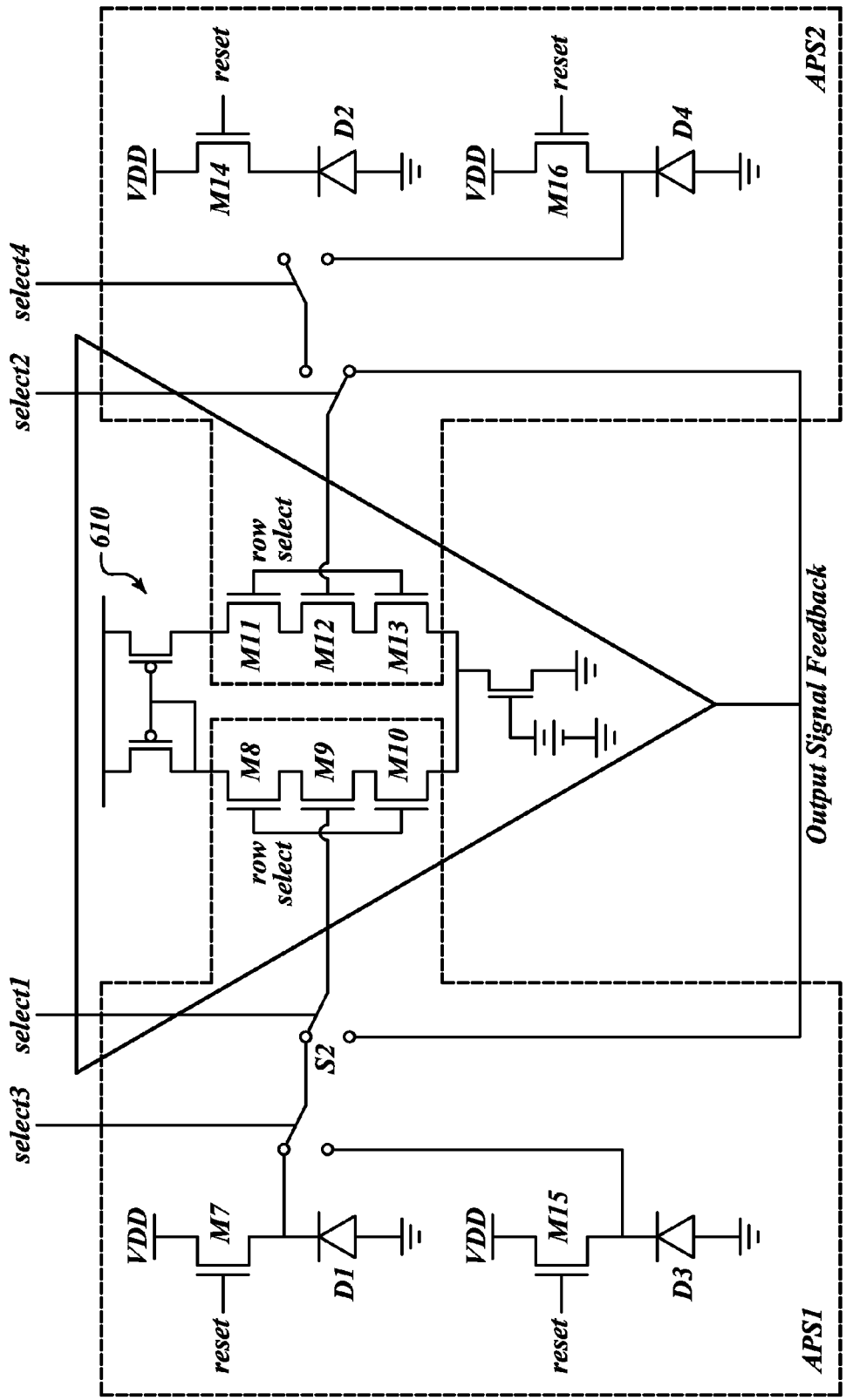
FIG. 14 is a circuit diagram of CMOS active pixel sensor in FIG. 6 where the read out circuitry is shared amount 2 photo sensitive elements (4 photo sensitive elements in total in each basic APS cell).

To further enhance the fill ratio and reduce the number of transistors used in each active pixel sensor in average, the distributed differential input transistor read out circuit can be shared among a plurality of photo sensor elements in close proximity. Showing in FIG. 14 is an example of the readout circuitry with differential input transistors shared among adjacent columns, and each read out structure is shared among four photo sensing elements, such that photo sensing elements in different rows will share the same readout structure. In this case, the switch signals S3 and S4 select, respectively, the photodiode ((either D1 or D3 and D2 or D4) to be used in the read out process. Reset transistors M7, M15, M14, and M16 may be the same or similar to reset transistors described above with reference to other embodiment. Transistors M8-M13 may the same or similar as with APS transistors M8-M13 described above in regards to FIG. 6. As such, these elements will not be further described. Unlike in FIG. 6, active pixel sensors APS1 and APS2 according to embodiments illustrated in FIG. 14 contain two photodiodes, rather than one.

All patents and publication referred to above are incorporated herein by reference. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. An imaging device, comprising:
    differential input amplifier circuitry;
    an output terminal; and
    a plurality of active pixel sensors (APSs), each including:
        a radiation sensor element configured to receive a dosage of radiation and, in response, to produce a signal corresponding to a level of the dosage; and
        input circuitry having an input terminal and configured to operably couple the input terminal to the radiation sensor element and to the output terminal, wherein the input circuitry is further configured to operably couple to the differential input amplifier circuitry, and wherein the input circuitry is further configured to form one half of a differential input pair if operably coupled to the differential input amplifier circuitry.

2. The imaging device of claim 1, wherein the input circuitry for each APS comprises a switching element configured to operably couple the input terminals for the APS to the output terminal and to its respective radiation sensor element.

3. The imaging device of claim 2, wherein switching element comprises a transistor.

4. The imaging device of claim 1, wherein the plurality of APSs are arranged in at least one array of pairs of adjacent APSs.

5. The imaging device of claim 4, wherein the differential input amplifier circuitry comprises a current source and a current mirror.

6. The imaging device of claim 1, wherein the input circuitry, another input circuitry, and the differential input amplifier circuitry are configured to form a differential input amplifier having a negative feedback loop if the input terminal of the input circuitry is selectively coupled to its respective radiation sensor element and if another input terminal of the other input circuitry is selectively coupled to the output terminal.

7. The imaging device of claim 2, further comprising a row decoder configured to operate a first switching element of a first input circuitry from the plurality of APSs to connect a first input terminal of the first input circuitry to the output terminal and to simultaneously operate a second switching element of a second input circuitry from the plurality of APSs to connect a second input terminal of the second input circuitry to its respective radiation sensor element.

8. The imaging device of claim 1, wherein input circuitry for each APS comprises MOSFET transistors.

9. The imaging device of claim 4, wherein the APSs in each adjacent APS pair are arranged in different rows of the array, and wherein the imaging device further comprises a row decoder configured to selectively and concurrently couple both a first input circuitry of a first adjacent APS and a second input circuitry of a second adjacent APS to the differential input amplifier circuitry to form a differential input pair for the differential input amplifier circuitry.

10. The imaging device of claim 4, wherein the plurality of radiation sensor elements are arranged in a matrix, wherein the APS in each adjacent APS pair are arranged in different columns of the array, and wherein the imaging device further comprises a row decoder configured to selectively and concurrently couple both a first input circuitry of a first adjacent APS and a second input circuitry of a second adjacent APS to the differential input amplifier circuitry to form a differential input pair for the differential input amplifier circuitry.

11. The imaging device of claim 1, further comprising a bus coupled to the plurality of APSs.

12. The imaging device of claim 5, wherein the current source is configured to feed a bias current to the input circuitry for each APS, and wherein the current source comprises a biasing transistor.

13. The imaging device of claim 12, wherein the biasing transistor is configured to select one of the plurality of radiation sensor elements to be active.

14. The imaging device of claim 11, wherein the input circuitry for each APS further comprises:

a selection transistor coupled to the radiation sensor element and to the input circuitry; and
a row decoder operatively coupled to the selection transistors and configured to select the selection transistor to couple the radiation sensor element to the input circuitry.

15. The imaging device of claim 14, wherein the row decoder is further configured to select another selection transistor for another APS coupled to another radiation sensor element and to another input circuitry for the other APS to change the resolution and/or sensitivity of the imaging device.

16. The imaging device of claim 1, further comprising signal processing circuitry coupled to the output terminal.

17. The imaging device of claim 16, wherein the signal processing circuitry comprises a correlated double sampler.

18. The imaging device of claim 1, wherein each radiation sensor element comprises a photogate having layers of polysilicon or a photodiode.

19. The imaging device of claim 1, wherein each radiation sensor elements comprises a photo sensor element.

20. The imaging device of claim 19, wherein each photo sensor element comprises a CMOS active pixel sensor.

21. A method of reading out values from an image sensor, the method comprising:

operatively coupling a first sensor element form a row of sensor elements to a first one of a matching pair of input transistors;
operatively coupling a second one of the matching pair of input transistors to an output terminal while the first sensor elements is coupled to the first one of the matching pair;
operatively coupling both the first one of the matching pair and the second one of the matching pair to differential input amplifier circuit to form a first differential input amplifier;
recording the output from the first differential input amplifier;
operatively coupling a second sensor element from the row of sensor elements to the second one of the matching pair;
operatively coupling the first one of the matching pair to the output terminal while the second sensor element is coupled to the second one of the matching pair;
operatively coupling both the first one of the matching pair and the second one of the matching pair to the differential input amplifier circuitry to form a second differential input amplifier; and
recording the output from the second differential input amplifier.

22. The method of claim 21, wherein the first differential input amplifier and the second differential input amplifier are both configured to have negative feedback loops.

23. The method of claim 21, wherein the differential input amplifier circuitry comprises a current source and a current mirror, and wherein said operatively coupling both the first one of the matching pair and the second one of the matching pair to differential input amplifier circuitry comprises logically coupling the matching pair between the current source and the current mirror.

* * * * *

UNITED STATES PATENT AND TRADEMARK OFFICE
CERTIFICATE OF CORRECTION

PATENT NO. : 7,602,429 B2 Page 1 of 1
APPLICATION NO. : 11/346494
DATED : October 13, 2009
INVENTOR(S) : Chi Wah Kok It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 817 days.

Signed and Sealed this

Fourteenth Day of December, 2010

David J. Kappos
*Director of the United States Patent and Trademark Office*